United States Patent [19]

Edler

[11] Patent Number: 4,781,874

[45] Date of Patent: Nov. 1, 1988

[54] PROCESS FOR MAKING SILICON NITRIDE ARTICLES

[75] Inventor: James P. Edler, Troy, Mich.

[73] Assignee: Eaton Corporation, Cleveland, Ohio

[21] Appl. No.: 111,839

[22] Filed: Oct. 23, 1987

[51] Int. Cl.$^4$ ............................................. C04B 35/58
[52] U.S. Cl. ..................................... 264/65; 423/344
[58] Field of Search ........................... 264/65; 423/344

[56] References Cited

U.S. PATENT DOCUMENTS

| | | | |
|---|---|---|---|
| 3,950,464 | 4/1976 | Masaki | 264/65 |
| 3,992,497 | 11/1976 | Terwilliger | 264/56 |
| 4,004,937 | 1/1977 | Masaki | 264/65 |
| 4,073,845 | 2/1978 | Buljan | 264/65 |
| 4,119,689 | 10/1978 | Prochazka | 264/65 |
| 4,164,328 | 8/1979 | Kausel | 241/175 |
| 4,252,860 | 2/1981 | Brennan et al. | 427/255.4 |
| 4,256,779 | 3/1981 | Sokol | 427/34 |
| 4,264,547 | 4/1981 | Pous | 264/65 |
| 4,285,895 | 8/1981 | Mangels | 264/65 |
| 4,376,742 | 3/1983 | Mah | 264/85 |
| 4,632,849 | 12/1986 | Ogawa et al. | 427/255 |
| 4,710,260 | 12/1987 | Witter et al. | 423/349 |

*Primary Examiner*—James Derrington
*Attorney, Agent, or Firm*—A. E. Chrow

[57] ABSTRACT

A process for making silicon nitride articles such as an internal combustion valve (8) by coating or causing silicon to grow on powdered silicon nitride particles through a vapor phase reaction and then forming and nitriding the articles in substantially less time than had the article been formed entirely from powdered silicon.

5 Claims, 1 Drawing Sheet

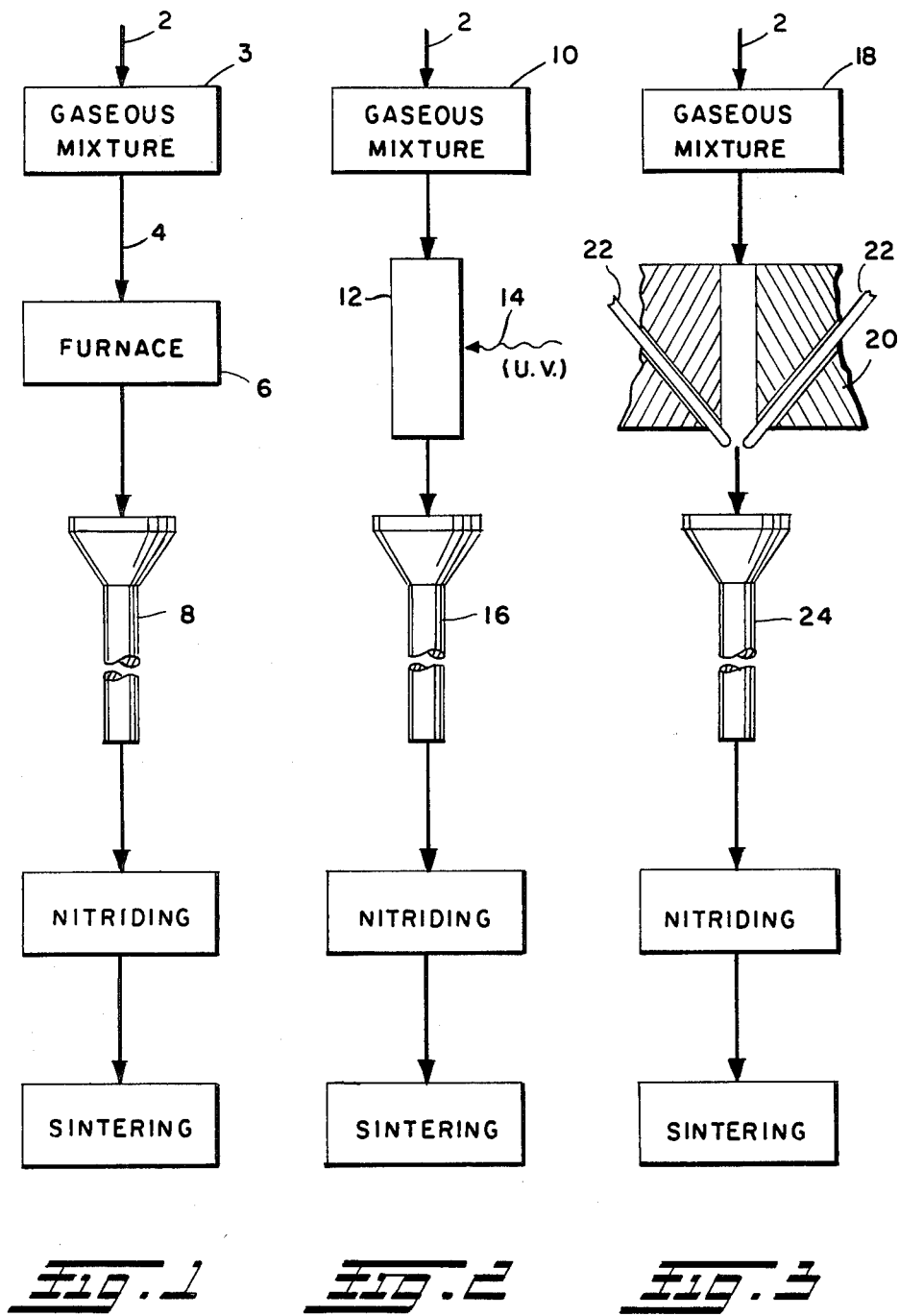

PROCESS FOR MAKING SILICON NITRIDE ARTICLES

INTRODUCTION

This invention relates generally to a process for making silicon nitride articles and more particularly to a process that includes coating or causing silicon to grow on powdered silicon nitride particles through a vapor phase reaction for use as a starting material and thence forming and nitriding the article therefrom in substantially less time then would have been required had the starting material been powdered silicon.

BACKGROUND OF THE INVENTION

Because of its excellent high temperature strength and creep resistance and resistance to oxidation and corrosion, silicon nitride has been used for many years to make parts such as turbine blades and vanes and internal combustion engine parts and other parts requiring endurance under high temperature conditions.

Generally, it has been the practice in the past to make the parts by using either powdered silicon or powdered silicon nitride as the starting materials. When the starting material is powdered silicon, it has been the practice to combine the silicon powder with a predetermined amount of at least one nitriding agent such as iron oxide and then proceed with what is known as a "reaction bonding" process which generally involves compacting the mix in a die under high pressure at ambient temperature to provide the article and then heating the article in a nitrogen containing gaseous environment at temperatures characteristically ranging from about 1350° C. to 1475° C. for long periods of time which commonly exceeds 20 hours due to the large mass of silicon commonly required to be converted to silicon nitride. Reaction bonding of silicon characteristically produces an article which consists of a porous, principally alpha-phase silicon nitride typically having 80–85% theoretical density. Many different processing routes exist, most requiring a long nitriding cycle of from 25 hr. to several hundred hours. When sintering aids are mixed with the silicon powder prior to reaction bonding, the reaction bonded article can be sintered to a high density after conversion of the silicon to alpha-silicon nitride to obtain mechanical properties similar to a sintered silicon nitride powder such as disclosed in U.S. Pat. No. 4,285,895, the disclosure of which is incorporated herein by reference. One of the advantages of this method is that a low amount of shrinkage occurs providing better dimensional control with less distortion when compared to an article manufactured from sintered silicon nitride powder.

A second method for making parts from silicon nitride is called "hot pressing" which involves starting with a billet of silicon nitride powder commonly including predetermined amounts of one or more "densification aids" such as monovalent metal oxides including MgO, BeO and divalent oxides such as $Al_2O_3$ and other oxides or other materials well known to those skilled in the art. In this method, the silicon nitride powder billet is then hot pressed in a graphite die into the article under intermediate pressures at temperatures commonly in the range of about 1650° C. to about 1850° C. and the article is then diamond ground to provide the finished product. This method, while providing superior properties, is characteristically also the most expensive.

A third method is provided by sintering compacted alpha-phase silicon nitride powder which is characteristically performed at a temperature of from about 1650° C. to about 1850° C. of which representative examples are disclosed in U.S. Pat. Nos. 3,992,497; 4,004,937; 4,073,845; and 4,264,547, the disclosures of which are incorporated herein by reference. Although this method produces mechanical properties similar to the "hot pressing" method and is utilized to provide more complicated shapes with less diamond grinding, it characteristically produces about 18% to about 20% shrinkage and significant distortions resulting from minor density variations in the article.

In addition to the use of nitriding agents and densification aids, it has also been common practice to include predetermined amounts of one or more organic binders with the silicon powder or silicon nitride powder to enhance bonding of the powder particles to each other during the process of forming the article.

Examples of processes using silicon nitride as the starting material in conjunction with densification aids and binders are respectively disclosed in U.S. Pat. Nos. 3,950,464; 3,992,497, 4,119,689, 4,164,328; and 4,376,742, the disclosure of which are incorporated herein by reference.

However, none of the previously described processes disclose or suggest the advantages associated with the process of the present invention which greatly reduces nitriding time by first coating or causing silicon to grow on silicon nitride particles then converting the thin silicon coating to silicon nitride during a nitriding process enabling substantial savings in cost and time as well as obtaining better dimensional control during sintering and substantially reducing diamond grinding time to produce the finished article.

SUMMARY OF THE INVENTION

Accordingly, it is an object of this invention to provide a process for making silicon nitride articles.

It is another object of this invention to provide a process for making silicon nitride articles that features coating or causing silicon to grow on silicon nitride particles by means of a vapor phase reaction.

It is still another object of this invention to provide a silicon nitride article made by a process that includes coating or causing silicon to grow on respective silicon nitride particles resulting in better dimensional control and substantial savings in cost and expense in producing the article.

BRIEF DESCRIPTION OF THE DRAWINGS

FIGS. 1–3 are respective block diagrams showing preferred embodiments of the process of the invention.

DESCRIPTION OF SOME PREFERRED EMBODIMENTS

Broadly, the process of the invention comprises coating alpha-phase silicon nitride powder particles with a layer of metallic-silicon through a vapor phase reaction and then preferably mixing the coated particles chemical with one or more appropriate sintering aids after which the coated particles or mix is consolidated or formed such as by dry pressing, isopressing, or slip casting into the article as a green body which is then nitrided and otionally sintered according to practices well known to those skilled in the art such as, for example, disclosed in U.S. Pat. No. 4,285,895, the disclosure of which is incorporated herein by reference. Since only the silicon coating requires converting to silicon nitride, the nitridation time is substantially shortened than had the entire particle been silicon resulting in economical manufacture, more complete nitridation, reductions in distortion and reduction in diamond grinding time compared to prior art processes hereinbefore described.

More particularly, an embodiment of the process of the invention is shown in FIG. 1 where slurry 4 is provided by aspirating finely ground silicon nitride particles 2 of preferably less than one micron in size into a mixture 3 of argon containing minor amounts of hydrogen and trichlorosilane and then flowing gaseous slurry 4 through a furnace 6 at a temperature and for a time predetermined to decompose the trichlorosilane and precipitate metallic silicon onto the silicon nitride particles at coating thicknesses typically from about 1 to about 500 nM and then forming the silicon coated alpha-silicon nitride particles into an article such as engine valve 8 followed by nitriding valve 8 and then preferably sintered the nitrided valve.

Another embodiment of the process of the invention is shown in FIG. 2 where alpha-silicon nitride powder particles 2 preferably less than 1 micron in size are aspirated into a gaseous mixture 10 of argon containing a minor amount of silane and then flowing the mixture into a glass tube 12 transparent to ultra-violet light radiation 14 whereby resultant mixture of particles 2 and gaseous mixture 10 is irradiated with ultra-violet light of sufficient energy to decompose the silane into metallic silicon which preferentially coats the silicon nitride particles to a thickness of about 1 to about 500 nM by controlling the residence time, gas composition, amount of alpha-silicon nitride particles and energy of the ultra-violet radiation after which an article such as engine valve 16 is formed followed by nitriding and preferably sintering.

Yet another embodiment of the process of the invention is shown in FIG. 3 where a gaseous mixture 18 of argon, trichlorosilane and, finely ground alpha-silicon nitride particulate 2 of preferably less than 1 micron in size is passed through a plasma arc torch 20 having electrodes 22 and which may be like the torch described in U.S. Pat. No. 4,256,779, the disclosure of which is incorporated herein by reference. The exposure to torch 20 is operative to decompose the trichlorosilane into metallic silicon which coats the alpha-silicon nitride particles which are then formed into an article such as engine valve 24 which is then nitrided and preferably sintered.

Although the silicon coated alpha-silicon nitride particles may be formed directly into an article such as engine valve 8 shown in FIG. 1 by compacting them together in a die under pressure, additives such as suitable nitriding aids and organic binders, and sintering aids well known to those skilled in the art may be added to provide the particular viscosity desired for the particular type of forming operation to be undertaken which includes pressure compacting, injection molding, and slip casting techniques well known to those skilled in the art.

In the event volatile additives such as organic binders are included, they can be removed by conventional techniques such as heating or heating in combination with vacuum either separately or during the early stages of the nitriding operation as is well known to those skilled in the art.

An article made by the process of the invention prior to nitriding is essentially a partial green stock since the contacting interface of adjacent particles is still silicon. The article is then exposed to a nitrogen containing gas such as nitrogen itself and heated in the presence of the gas generally at a temperature within a predetermined nitriding temperature range and of which the rate of climb of the temperature from ambient to the nitriding temperature range may itself be a factor and of which a preferred method is to first heat the article under vacuum to a temperature of from about 950° C. to about 1050° C. in about 1 to 2 hours and then admit the nitriding gas and continue heating the article up to the nitriding temperature range at a rate of about 15° C. to about 25° C. per hour.

Understandably, the nitriding chamber is preferably provided with means for removing volatiles from the chamber such as a vacuum outlet particularly during the early stages of the nitriding operation after which, upon conversion of the silicon coating to silicon nitride, the article is cooled to ambient or its temperature can be further increased to sintering of the silicon nitride particles, and then the article is cooled to ambient.

What is claimed is:

1. A process for making a silicon nitride article, said process including the steps of:
   (a) providing powdered alpha-silicon nitride particles;
   (b) coating the articles of step (a) with metallic silicon by means of a vapor phase reaction;
   (c) forming the coated particles of step (b) into the article; and
   (d) nitriding the article of step (c) at a temperature and for a time effective to convert the metallic silicon to silicon nitride.

2. The process of claim 1 including the step of sintering the nitrided article of step (d).

3. The process of claim 1 wherein the coating of step (b) is provided by aspirating the particles of step (a) into a mixture of argon and a minor amount of trihlorosilane to provide a gaseous slurry and then flowing the gaseous slurry through a furnace at a temperature and for a period of time effective to decompose the trichlorosilane into the metallic silicon.

4. The process of claim 1 wherein the coating of step (b) is provided by aspirating the particles of step (a) into a mixture of argon containing a minor amount of silane to provide a gaseous slurry and thence exposing the slurry to ultra-violet radiation effective to decompose the silane into the metallic silicon.

5. The process of claim 1 wherein the coating of step (b) is provided by mixing the alpha-silicon nitride particles of step (a) with argon and trichlorosilane and thence exposing the mixture to a plasma arc torch effective to decompose the trichlorosilane into the metallic silicon.

* * * * *